T. J. Mayall,
Sink-Pipe,
Nº 24,476. Patented June 21, 1859.
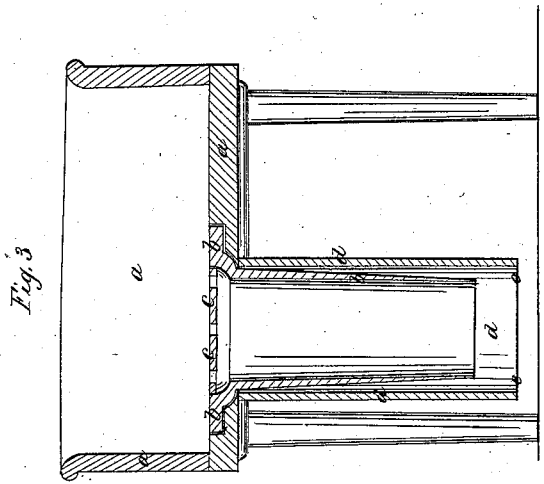
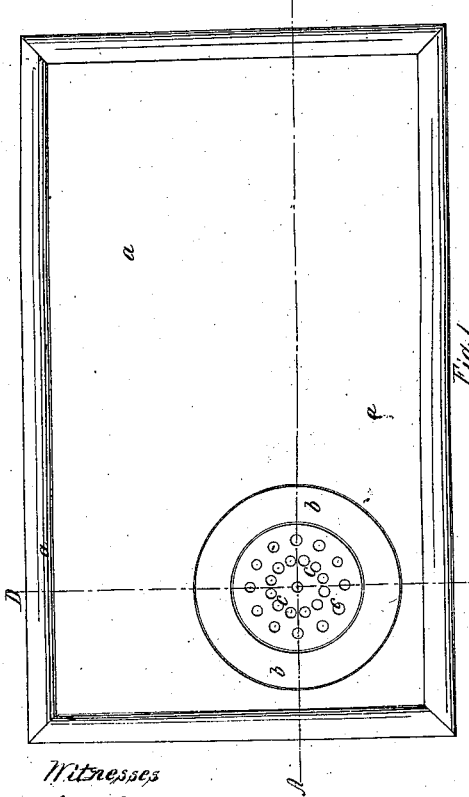
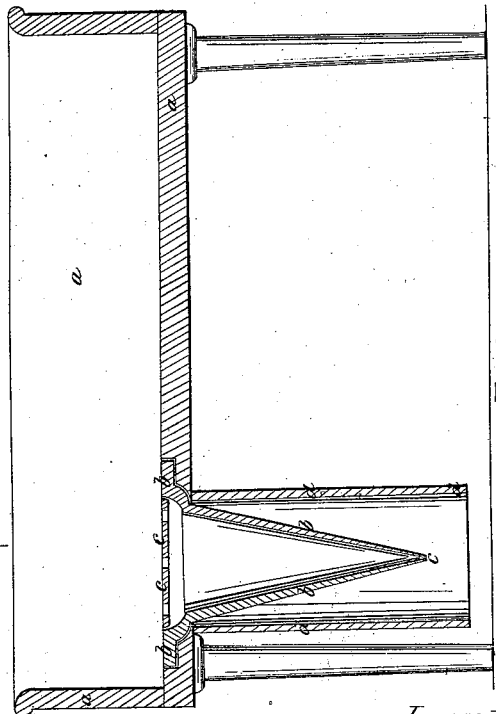
Witnesses
Joseph Garrett
Albert W. Brown
Inventor
Th. J. Mayall

UNITED STATES PATENT OFFICE.

THOMAS J. MAYALL, OF ROXBURY, MASSACHUSETTS.

DRAINAGE-PIPE.

Specification of Letters Patent No. 24,476, dated June 21, 1859.

*To all whom it may concern:*

Be it known that I, THOMAS J. MAYALL, of Roxbury, in the county of Norfolk and State of Massachusetts, have invented certain new and useful Improvements in Drain-Pipes for Sinks, Washing-Tubs, Stationary Washing-Bowls, &c., and that the following description, taken in connection with the accompanying drawings, hereinafter referred to, forms a full and exact specification of the same, wherein I have set forth the nature and principles of my improvements, by which my invention may be distinguished from all others of a similar class, together with such parts as I claim and desire to have secured to me by Letters Patent.

The figures of the accompanying plate of drawings, represent my improvements.

Figure 1 is a plan or top view of a sink with my improved drain-pipe attached thereto. Fig. 2 is a longitudinal vertical section of the same taken in the plane of the line A, B Fig. 1. Fig. 3 is a transverse vertical section taken in the plane of the line C, D Fig. 1.

My invention consists in combining with sinks, stationary washing-bowls, washing-tubs and other similar articles a drain-pipe of vulcanized india rubber or gutta percha or of either or both of these substances, compounded with other materials as practiced by rubber manufacturers and so constructed as to allow the free passage of water through it as well as to make a scent trap to stop the foul air from ascending from the drains. I make this drain pipe in a form, gradually changing from a circular hole at the top to a wedge shape at the bottom, through a slit in which the water is allowed to pass. The elasticity of the rubber or gutta percha at the bottom of the pipe keeps the slit closed when water is not passing through, thus constituting a self-acting valve.

*a a a* in the drawings represent a sink made of any suitable material.

*b b* is the drain pipe inserted in the bottom of the sink as shown, and having a strainer *c*.

*d d* is the waste pipe. The top of the drain pipe is of a circular form and gradually tapers to a wedge shape at the bottom, Figs. 2 and 3, leaving a narrow opening or slit *e* at the bottom, which opens by the weight of the water and closes after its passage, thus constituting a self-acting valve and scent trap, which may be used in sinks, washing-tubs, &c., to take the place of the cesspools heretofore employed for the purpose. The drain-pipe can be made square, or oval, or of any other convenient form at the top, gradually changing to a wedge shape at the bottom.

Having thus described my improvements, I shall state my claim as follows,

What I claim as my invention and desire to have secured to me by Letters Patent, is—

Combining with a stationary washing-bowl, sink, washing tub or other similar articles, the elastic drainage pipe terminating in a wedge shape, for the purposes and in the manner described.

THOS. J. MAYALL.

Witnesses:
JOSEPH GAVETT,
ALBERT W. BROWN.